(12) United States Patent
Ogawa et al.

(10) Patent No.: US 6,611,651 B1
(45) Date of Patent: Aug. 26, 2003

(54) MATERIAL FOR OPTICAL WAVEGUIDE, AND OPTICAL WAVEGUIDE AND METHOD FOR MANUFACTURING THE SAME

(75) Inventors: Tsuyoshi Ogawa, Kanagwa (JP); Kozaburo Hayashi, Tochigi (JP); Yasuko Iokawa, Tochigi (JP)

(73) Assignees: Sony Corporation, Tokyo (JP); Sony Chemicals Corp., Tokyo (JP)

( * ) Notice: Subject to any disclaimer, the term of this patent is extended or adjusted under 35 U.S.C. 154(b) by 44 days.

(21) Appl. No.: 09/594,907

(22) Filed: Jun. 15, 2000

(30) Foreign Application Priority Data

Jun. 16, 1999 (JP) ............................................ 11-169842

(51) Int. Cl.[7] ................................................. G02B 6/00
(52) U.S. Cl. ........................ 385/143; 385/129; 385/141
(58) Field of Search ................................. 385/141, 142, 385/143, 144, 145, 129, 130, 131, 132

(56) References Cited

U.S. PATENT DOCUMENTS

| 3,816,160 | A | * | 6/1974 | Moore ........................ 350/96.1 |
| 4,615,584 | A | * | 10/1986 | Ohmori et al. .............. 385/143 |
| 4,617,350 | A | * | 10/1986 | Maeda et al. ................ 525/153 |
| 4,844,604 | A | * | 7/1989 | Bishop et al. ................ 385/115 |
| 5,674,922 | A | * | 10/1997 | Igarashi et al. .............. 522/168 |
| 6,015,914 | A | * | 1/2000 | Sasaki et al. ................ 528/414 |

FOREIGN PATENT DOCUMENTS

| JP | 08269392 A | * | 10/1996 |
| JP | 2000297149 A | * | 10/2000 |

* cited by examiner

*Primary Examiner*—Rodney Bovernick
*Assistant Examiner*—Sung Pak
(74) *Attorney, Agent, or Firm*—Sonnenschein, Nath & Rosenthal

(57) ABSTRACT

Disclosed are a material for an optical waveguide, which has high polymerizability and high solvent resistance, an optical waveguide made of the material, and a method for manufacturing the optical waveguide. When a material for an optical waveguide from which organic material layers are made is irradiated with an energy beam, it is activated to make a cladding and a core. The material comprises an oxetane compound, an oxirane compound, and a cationic polymerization initiator. Since the oxetane compound has an oxetane ring, it has a high repeated reactivity in a chain reaction. Thus, the material has high polymerizability at the time of a chain reaction, so that a polymer having an increased mechanical strength and a high solvent resistance is produced. The oxetane compound and the oxirane compound have high compatibility with each other and the refractive index of each of the compounds is reflected in the refractive index of a cured mixture. The refractive index of each of the core and cladding can be therefore controlled.

23 Claims, 1 Drawing Sheet

MATERIAL FOR OPTICAL WAVEGUIDE, AND OPTICAL WAVEGUIDE AND METHOD FOR MANUFACTURING THE SAME

BACKGROUND OF THE INVENTION

1. Field of the Invention

The present invention relates to a material for forming an optical waveguide through which a light signal can be propagated, and an optical waveguide made of the material and a method for manufacturing the optical waveguide.

2. Description of the Related Art

As the technology in an IC (Integrated Circuit) and an LSI (Large Scale Integrated) circuit progresses, their operating speed and scale of integration have been being improving, thereby rapidly promoting, for example, an enhancement in performance of a microprocessor and an increase in capacity of a memory chip. Hitherto, transmission of information over relatively short distances, for example, between boards in a device or between chips on a board is carried out mainly via an electric signal. In order to further improve the performance of an integrated circuit in the future, it is necessary to increase the transmission rate of a signal and the density of signal wiring. In the electric signal wiring, however, it is difficult to increase the transmission rate of a signal and the density of signal wiring, and a problem of a signal delay due to a time constant of CR (C: electrostatic capacitance of the wiring and R: resistance of the wiring) of the wiring arises. Since an increase in transmission rate of the electric signal and an increase in density of the electric signal wiring cause EMI (Electromagnetic Interference) noises, it is indispensable to take countermeasures against the problems.

Attention is being paid to optical wiring (optical interconnection) as means for solving the problems. The optical wiring is considered to be applicable to various situations such as the interconnection between devices, between boards in a device, or between chips on a board. For transmission of signals over relatively short distances such as transmission between chips, an optical transmission communication system in which an optical waveguide is formed on a substrate on which chips are mounted and is used as a transmission line is suitable.

Hitherto, an optical waveguide of this kind is made of an inorganic glass material such as quartz. In the case of forming an optical waveguide by using the inorganic glass material, however, heat treatment at high temperatures has to be performed. Consequently, the optical waveguide cannot be formed on a substrate such as a semiconductor substrate or a plastic substrate which cannot be subjected to the heat treatment at high temperatures.

On the other hand, in recent years, an optical waveguide made of a high polymer material has been proposed (see Japanese Unexamined Patent Application Nos. 7-56030 and 7-159630) and is becoming commercially practical. High polymer materials can be processed easier as compared with inorganic materials. A device of a larger area and in the form of a film can be easily formed by using a high polymer material. The high polymer materials have various advantages such as a wide range of applications owing to their flexibility, and easy adjustment of a refractive index. Among the high polymer materials, an ultraviolet-setting resin is a material which is cheap and can be produced in quantities. An ultraviolet-setting resin is therefore expected as a material for optical waveguide. A known example of the ultraviolet-setting resins is an epoxy resin.

An optical waveguide made of an epoxy resin is generally formed by applying the resin on a supporting substrate, selectively exposing the resin, and performing a developing process of wet-etching uncured portions in the resin.

Since the polymerizability of an epoxy resin is low, however, when the optical waveguide is formed by using an epoxy resin, there is a problem such that a large amount of energy is necessary to cure the resin and this deteriorates production efficiency.

Since an epoxy resin has low solvent resistance, at the time of wet-etching the uncured portion in the resin, the cured portion is also dissolved. This causes a problem such that the optical waveguide cannot be formed in a desired shape.

Japanese Patent Publication No. 2679586 discloses an activated energy beam curing composition comprising a compound having two or more oxetane rings per molecule, a compound having one or more oxirane rings per molecule, and a cationic polymerization initiator. However, there is no disclosure as to whether the composition can be used as a material of an optical waveguide. If the composition can be used as a material of an optical waveguide, the publication does not clarify conditions under which the composition can be used.

SUMMARY OF THE INVENTION

The present invention has been achieved in consideration of the problems and its object is to provide a material for an optical waveguide, having high polymerizability and high solvent resistance, and an optical waveguide made of the material and a method for manufacturing the optical waveguide.

According to the invention, there is provided a material for an optical waveguide through which a light signal can propagate, comprising: a first compound having an oxetane ring; and a second compound capable of initiating polymerization by a chain reaction.

According to the invention, there is provided an optical waveguide through which a light signal can propagate, wherein the optical waveguide is formed by using a material for an optical waveguide comprising a first compound having an oxetane ring and a second compound capable of initiating polymerization by a chain reaction.

According to the invention, there is provided a method for manufacturing an optical waveguide through which a light signal can propagate, the method comprising: a step of forming an organic material layer on a supporting substrate by using a material for an optical waveguide comprising a first compound having an oxetane ring and a second compound capable of initiating polymerization by a chain reaction; a step of selectively exposing and curing the organic material layer by selectively irradiating the organic material layer with an energy beam; and a step of forming an optical waveguide by a developing process of removing an uncured portion in the organic material layer.

Since the material for an optical waveguide of the invention comprises the first compound having the oxetane ring, it has high polymerizability and high solvent resistance.

In the optical waveguide according to the invention, a light signal enters from one end face, propagates through the optical waveguide and goes out from the other end face. The optical waveguide comprises the material for an optical waveguide of the invention, which contributes to high solvent resistance.

In the method for manufacturing the optical waveguide according to the invention, the organic material layer made of the material for an optical waveguide of the invention is selectively irradiated with an energy beam and the irradiated portions are cured. After that, the uncured portions in the organic material layer are removed by the developing process, thereby obtaining the optical waveguide.

Other and further objects, features and advantages of the invention will appear more fully from the following description.

DETAILED DESCRIPTION OF THE PREFERRED EMBODIMENT

An embodiment of the invention will be described in detail hereinbelow.

A material for an optical waveguide according to an embodiment of the invention will be described first. The material for an optical waveguide according to the embodiment is used to form a core or a cladding of an optical waveguide of which refractive index with respect to the D line of sodium at, for example, 25° C. lies within the range from 1.45 to 1.61. When the material is irradiated with an energy beam, it is activated and cured. The material for optical waveguide comprises an oxetane compound having an oxetane ring of a composition shown in Formula 1:

an oxirane compound having an oxirane ring of a composition shown in Formula 2:

and a cationic polymerization initiator capable of initiating polymerization by a chain reaction.

The oxetane compound corresponds to a specific example of "first compound" of the invention, the oxirane compound corresponds to a specific example of "third compound" of the invention, and the cationic polymerization initiator corresponds to a specific example of "second compound" of the invention.

The oxetane ring in the oxetane compound has a characteristic that its strain is smaller than that of the oxirane ring. In the oxetane ring, consequently, electrons tend to gather around oxygen (O) as compared with the oxirane ring and the electron density of carbon (C) bonded to oxygen is low. The carbon is therefore vulnerable to an attack of a nucleophilic reagent as compared with a carbon bonded to oxygen in the oxirane ring. That is, in the oxetane compound, a monomer is more likely to be added to a growth end (active end).

On the other hand, the above-mentioned characteristic of the oxetane compound causes a delay in initiation of a ring-opening reaction of the oxetane ring. Specifically, since the strain energy of the ring is small, when the compound is attacked by a cation (catalyst) such as a hydrogen ion ($H^+$), the ring is not opened by a reaction only with one molecule of the catalyst (hereinbelow, called one-molecule reaction). In order to improve the production efficiency of the optical waveguide, it is preferable that the oxetane compound and a compound from which active species are promptly produced by a chain reaction mixedly exist.

Preferably, the refractive index before curing of the oxetane compound with respect to the D line of sodium at 25° C. lies within the range from 1.45 to 1.58. When the refractive index is lower than 1.45, in many cases, fluorine (F) is contained in the compound, which causes an inconvenience such that compatibility with the oxirane compound deteriorates. When the refractive index is higher than 1.58, in many cases, bromine (Br) or sulfur (S) is contained in the compound, which causes an inconvenience such that the compatibility with the oxirane compound deteriorates. Especially, in the case of using the material for forming a core, it is preferable that the refractive index be within the range from 1.50 to 1.58. In the case of using the material for forming a cladding, it is preferable that the refractive index be lower than 1.5 and more preferably within the range from 1.45 to 1.48. The reason is as follows. When the difference between the refractive index of the material of the core and that of the material of the cladding is about 0.001 or higher in a single mode or is about 0.01 to 0.1 or higher in a multiple mode, an optical waveguide having an excellent light propagation characteristic can be formed.

Specific examples of the oxetane compound are di[1-ethyl (3-oxetanyl)]methyl ether (liquid at room temperatures) shown in Formula 3:

a mixture (hereinbelow, also called xylene dioxetane) shown in Formula 4:

(liquid at room temperatures) of 1,4-bis{[3-ethyl-3-oxetanyl)methoxy]methyl}benzene and di[4-(1-ethyl-3-oxetanylmethoxymethyl)]benzyl ether, phenol novalac oxetane (solid at room temperatures) shown in Formula 5:

(wherein n denotes an integer including 0 and the average is about 4), and oxetanyl silesquioxetane (liquid at room temperatures) shown in Formula 6:

As an oxetane compound, one of them or a mixture of two or more of them may be used. In particular, as an oxetane compound, di[1-ethyl(3-oxetanyl)]methyl ether is especially preferable from the viewpoint of increasing the solvent resistance of an organic material layer when the organic material layer made of a material for an optical waveguide which will be described hereinlater is subjected to a developing process. The oxetane compound can take the form of a monomer or a polymer (including oligomer).

The formulation ratio of the oxetane compound in the material for optical waveguide is preferably within the range from 10 to 70 percent by weight for the following reason. When the formulation ratio is lower than 10 percent by weight, an inconvenience such that the material is not easily cured and the solvent resistance deteriorates occurs. When the formulation ratio is higher than 70 percent by weight, an inconvenience such that the material is not easily cured occurs.

In particular, in the case of using the material to form a core of an optical waveguide, preferably, less than 50 percent by weight of the oxetane compound having a refractive index with respect to the D line of sodium at 25° C. (hereinbelow, also simply referred to as refractive index) lower than 1.5 is contained and 25 percent by weight or higher of an oxetane compound having a refractive index equal to or higher than 1.5 is contained. More preferably, 10 to 30 percent by weight of an oxetane compound having a refractive index lower than 1.5 and 40 to 60 percent by weight of an oxetane compound having a refractive index equal to or higher than 1.5 are contained since the difference between the refractive index in a core and that in a cladding can be stably obtained.

When the material is used to form a cladding of an optical waveguide, which has a refractive index lower than that of the core, preferably, 30 percent by weight or higher of an oxetane compound having a refractive index lower than 1.5 is contained and no oxetane compound having a refractive index of 1.5 or higher is contained. More preferably, more than 40 percent by weight of an oxirane compound having a refractive index lower than 1.5 is contained since the difference between the refractive index of the cladding and that of the core can be stably obtained.

As described above, the oxirane compound contains the oxirane ring having a strain larger than that of the oxetane ring. When the oxirane compound is attacked by a cation, the oxirane ring is opened by the one-molecule reaction and active species are produced. Consequently, the oxirane compound is suitable as compound which comprises the material for optical waveguide together with the oxetane compound.

Preferably, the refractive index before curing of the oxirane compound lies within the range from 1.45 to 1.58 for the following reason. When the refractive index is lower than 1.45, in many cases, fluorine is contained in the compound, which causes an inconvenience such that compatibility with the oxetane compound deteriorates. When the refractive index is higher than 1.58, in many cases, bromine or sulfur is contained in the compound, which causes an inconvenience such that the compatibility with oxetane compound deteriorates. Especially, in the case of using the material for forming a core, it is preferable that the refractive index be within the range from 1.50 to 1.58. In the case of using the material for forming a cladding, it is preferable that the refractive index be lower than 1.5 and more preferably within the range from 1.45 to 1.48.

Such oxirane compounds are of various types, which are normally used as epoxy resins. Specific examples include an aliphatic cyclic epoxy resin having two or more functional groups (solid or liquid at room temperatures), a glycidyl type epoxy resin (liquid at room temperatures) such as epoxy resin containing bisphenol A or F, and limonene dioxide (liquid at room temperatures). One of the oxirane compounds or a mixture of two or more of the compounds may be used. The oxirane compound may take the form of a monomer or a polymer (including an oligomer).

Preferably, the formulation ratio between the oxirane compound and the oxetane compound (oxetane compound/oxirane compound) in the material for optical waveguide lies within the range from 1/9 to 7/3 and more preferably within the range from 3/7 to 7/3. When the ratio is lower than 1/9, an inconvenience such that the material is not easily cured and the solvent resistance deteriorates occurs. When the ratio is higher than 7/3, an inconvenience such that the material is not easily cured occurs.

In particular, in the case of using the material to form a core of an optical waveguide, preferably, less than 50 percent by weight of an oxirane compound having a refractive index lower than 1.5 is contained and 10 percent by weight or more of an oxirane compound having a refractive index equal to or higher than 1.5 is contained. It is more preferable that 10 to 30 percent by weight of an oxirane compound having a refractive index lower than 1.5 be contained and 30 to 70 percent by weight of an oxirane compound having a refractive index equal to or higher than 1.5 be contained, since the difference between the refractive index of a core and that of a cladding can be stably obtained.

In the case of using the material to form a cladding of the optical waveguide, preferably, more than 25 percent by weight of an oxirane compound having a refractive index lower than 1.5 is contained and no oxirane compound having a refractive index equal to or higher than 1.5 is contained. More preferably, 60 percent by weight or more of an oxirane compound having a refractive index lower than 1.5 is contained since the difference between the refractive index of a cladding and that of a core can be stably obtained.

The cationic polymerization initiator is to initiate a chain reaction of the oxetane compound, oxirane compound or the like. The preferable formulation ratio in the material for optical waveguide lies within the range from 0.5 to 5 percent by weight and more preferably within the range from 1 to 3 percent by weight. When the formulation ratio is lower than 0.5 percent by weight, the chain reaction does not sufficiently progress, which causes an inconvenience such that the material is not easily cured and the solvent resistance deteriorates. When the formulation ratio is higher than 5 percent by weight, the chain reaction takes place only in a surface layer portion of the material. Consequently, an inconvenience such that the reaction does not progress on the inside occurs.

An example of the cationic polymerization initiator is a known cationic photopolymerization initiator such as aromatic iodonium salt or aromatic sulfonium salt. Among the initiators, it is preferable to use the aromatic sulfonium salt from the viewpoint of making the chain reaction sufficiently progress.

The material for optical waveguide having such a composition can be prepared by mixing, for example, an oxetane compound, an oxirane compound, and a cationic polymerization initiator at a predetermined ratio by weight and heating the components at, for example, 90° C. for two hours. Other components such as a coupling agent for giving adhesive properties and a leveling agent for giving surface smoothness can be also contained.

A method for manufacturing an optical waveguide by using any of the materials will be described by referring to FIGS. 1A to 1G. Since the optical waveguide according to the embodiment is embodied by the method for manufacturing the optical waveguide of the embodiment, it will be also described hereinbelow.

Figure 1A:
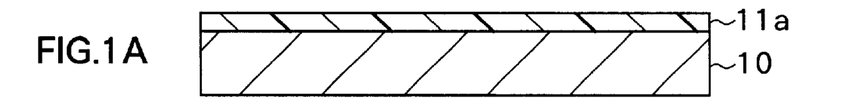
FIGS. 1A to 1G are cross sections for illustrating a method for manufacturing an optical waveguide according to an embodiment of the invention.

First, as shown in FIG. 1A, the material for a cladding in an optical waveguide is applied on a substrate 10 made of silicon or the like so as to have a thickness after curing of, for example, about 30 $\mu$m, thereby forming an organic material layer 11a. In this case, a material used is obtained by mixing 22 parts by weight of di[1-ethyl(3-oxetanyl)] methyl ether (product name DOX made by Toagosei Co., Ltd.), 13 parts by weight of oxetanyl silsesquioxetane (product name OXSQ made by Toagosei Co., Ltd.), 35 parts by weight of polyfunctional aliphatic cyclic epoxy resin (product name EHPE3150 made by Daicel Chemical Industries, Ltd.), and 30 parts by weight of bifunctional aliphatic cyclic epoxy resin (product name celloxide2021P made by Daicel Chemical Industries, Ltd.), heating the components at 90° C. for two hours and, after that, adding 2 parts by weight of 4-4'bis [di($\beta$hydroxyethoxy) phenylsulfonio]phenylsulfide-bis-hexafluoroantimonate (product name SP170 made by Asahi Denka Kogyo K.K.).

Figure 1B:
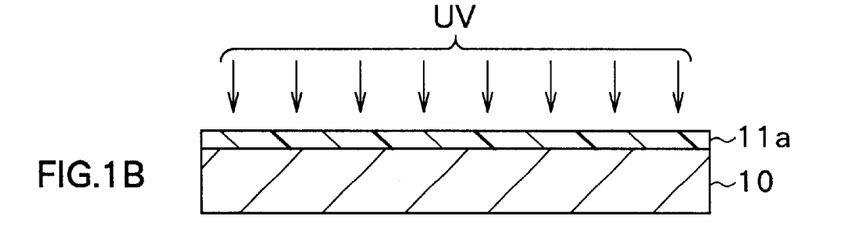
Figure 1C:
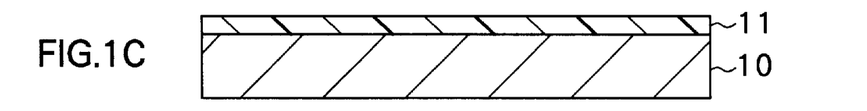

As shown in FIG. 1B, the entire organic material layer 11a is irradiated with, for example, ultraviolet rays UV for 60 seconds with an output of 25 mW/cm$^2$ by using a mercury lamp of very high pressure, thereby curing the material for a cladding in the optical waveguide. Thus, as shown in FIG. 1C, a cladding 11 of the optical waveguide, which has a refractive index of about 1.51 is formed. When the organic material layer 11a is completely cured, the refractive index becomes higher by, for example, about 0.025.

In this case, first, the oxirane ring in the oxirane compound is opened by the one-molecule reaction and a chain reaction is initiated. Then the oxetane ring in the oxetane compound is opened and a chain reaction is initiated. Since the oxetane compound has high reactivity as described above, the repeated reaction promptly progresses. Even when an exposure energy is small, therefore, the material for a cladding in an optical wave guide is sufficiently cured. Since the repeated reaction of the oxetane compound sufficiently progresses, the degree of crosslinking of the material for a cladding in an optical waveguide can be increased and the mechanical strength of the cladding 11 is improved.

Figure 1D:
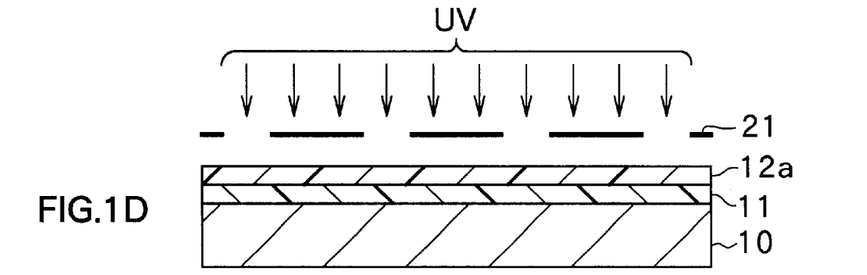

As shown in FIG. 1D, on the cladding 11, an organic material layer 12a is formed by applying a material for a core in an optical waveguide so as to have a thickness after curing of, for example, 30 $\mu$m. The material is obtained by mixing 10 parts by weight of xylene dioxetane (product name XDO made by Toagosei Co., Ltd.), 20 parts by weight of phenol novolac oxetane (made by Toagosei Co., Ltd.), 30 parts by weight of bifunctional aliphatic cyclic epoxy resin, 20 parts by weight of a mixture of bisphenol A epoxy resin and bisphenol F epoxy resin (mixture ratio of about 1:1) (product name epotohto ZX1059 made by Tohto Kasei Co., Ltd.), and 20 parts by weight of bisphenol A epoxy resin (product name epicoat 828 made by Yuka Shell Epoxy K.K.), heating the mixture at 90° C. for two hours, and adding 2 parts by weight of 4-4'bis[di($\beta$hydroxyethoxy) phenylsulfonio]phenylsulfide-bis-hexafluoroantimonate as a cationic polymerization initiator.

Figure 1E:
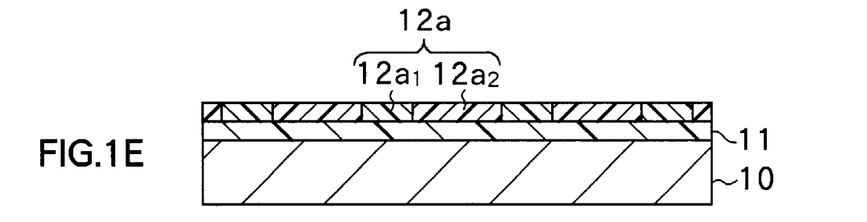

The organic material layer 12a is irradiated with ultraviolet rays UV via a photomask 21 having, for example, striped apertures. Specifically, for example, the photomask 21 is positioned over the organic material layer 12a so as not to be in contact with the organic material layer 12a and the organic material layer 12a is irradiated with the ultraviolet rays UV through the photomask 21. The ultraviolet rays UV are applied, for example, with an output of 20 to 200 mW/cm$^2$ for 5 to 120 seconds by using a mercury lamp of very high pressure. Thereby, as shown in FIG. 1E, in portions $12a_1$ corresponding to the apertures of the photomask 21 of the organic material layer 12a, the material for the core of the optical waveguide constructing the organic material layer 12a is cured.

For reasons similar to those of the case of forming the cladding 11, the material can be cured with a small exposure energy and the degree of crosslinking of the material can be increased.

When ultraviolet rays are applied in a state where the uncured organic material layer 12a and the photomask 21 are closely attached to each other, the organic material layer 12a and the photomask 21 are adhered to each other. It is therefore necessary to dispose the photomask 21 so as not to be in contact with the organic material layer 12a as described above. This can be realized by, for example, a proximity printing method of irradiating a member to be exposed with light with a gap of about 100 $\mu$m provided between the mask and the member or a projection printing method of disposing the mask so as to be apart from a member to be exposed and optically forming an image.

After an elapse of predetermined time from the application of the ultraviolet rays UV, uncured portions $12a_2$ which have not been irradiated with the ultraviolet rays UV because of the photomask 21 are dissolved and removed with, for example, acetone. At this time, since the degree of crosslinking of the cladding 11 and the cured portions of the organic material layer 12a is high, the possibility that the areas are dissolved is low. In this case, acetone corresponds to a specific example of "developing solution" of the invention. As the developing solution, besides acetone, for example, an acid solution or alkaline solution can be used. It is however preferable to use acetone which has high solubility in the uncured portions $12a_2$ in the organic material layer 12a and exerts little influence on the cured portions (that is, portions $12a_1$ corresponding to the apertures of the photomask 21). Since acetone has low toxicity and has a low boiling point, there is also an advantage that acetone is generally easily handled.

Figure 1F:
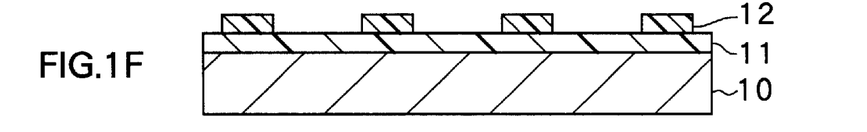

The organic material layer 12a is washed by a rinsing solution such as isopropyl alcohol to remove acetone which penetrates in the organic material layer 12a to thereby make the organic material layer 12a swollen. Thus, as shown in FIG. 1F, a plurality of cores 12 of the optical waveguide each having, for example, a strip shape in plan view and having a refractive index of about 1.56 are formed. The reasons of using isopropyl alcohol as a rinsing solution are as follows. Isopropyl alcohol hardly exerts an influence on the cores 12 and has high compatibility with acetone as a developing solution. Consequently, the uncured portions of the organic material layer 12a can be completely removed while making the cured portions (that is, the cores 12) remain almost completely and the cores 12 can be finished without leaving dusts on the substrate 10.

Figure 1G:
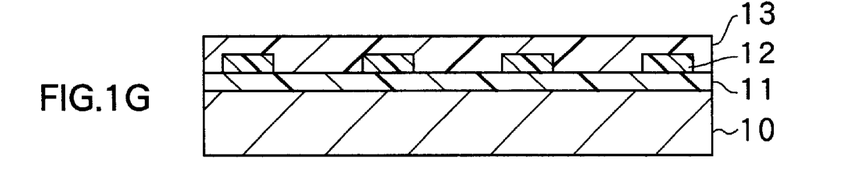

Finally, as shown in FIG. 1G, for example, a cladding 13 is formed on the exposed face of the cladding 11 and the cores 12 by using a material similar to that of the cladding 11 in a manner similar to the method of forming the cladding 11. A buried type optical waveguide constructed by the cores 12 and the claddings 11 and 13 is completed.

In the optical waveguide manufactured in such a manner, when a light signal enters from one end face, the light signal propagates in the optical waveguide and goes out from the other end face.

In the embodiment, since the material for optical waveguide contains the oxetane compound having high repeated reactivity in the chain reaction and the oxirane compound having high active species generation reactivity (initiability), when the material for optical waveguide is irradiated with light, even by an exposing energy smaller than that in the case of irradiating an epoxy resin, the material is promptly cured. That is, when the irradiation intensity is constant, the material is cured in short time. When the irradiation time is constant, the material is cured with weak irradiation intensity. Consequently, the production efficiency of the optical waveguide is improved.

Since the oxetane compound has high repeated reactivity, the degree of crosslinking of the material for optical waveguide can be increased, and the mechanical strength and solvent resistance of the cured areas in the organic material layer 12a and the cladding 11 are improved. Thus, the areas are not dissolved and the cores 12 and the cladding 11 in a desired shape can be formed.

Further, the oxetane compound and the oxirane compound have high compatibility with each other, the refractive index of each of the compounds is stably reflected in the refractive index after the material is cured. The refractive index of each of the cores 12 and the claddings 11 and 13 can be controlled, so that an optical waveguide of a little optical propagation loss can be formed.

Examples of the invention will now be described in detail.

EXAMPLES 1 TO 10

First, the oxetane compound, oxirane compound, and cationic polymerization initiator were prepared as shown in Table 1.

TABLE 1

| Kind of compound | Kind of material | Refractive index (25° C., D line) |
|---|---|---|
| oxetane compound | di[1-ethyl(3-oxetanyl)]methyl ether | 1.4544 |
| | xylene dioxetane | 1.5102 |
| | phenol novolac oxetane | about 1.57 |
| | oxetanyl silsesquioxetane | 1.4787 |
| oxirane compound | limonene dioxide | 1.4656 |
| | polyfunctional aliphatic epoxy resin | about 1.47 |
| | mixture of bisphenol A epoxy resin and bisphenol F epoxy resin | 1.5703 |
| | bisphenol A epoxy resin | 1.5683 |
| | bifunctional aliphatic cyclic epoxy resin | 1.4767 |
| cationic polymerization initiator | 4-4'bis[di(βhydroxyethoxy) phenyl sulfonio]phenylsulfide-bis-hexafluoroantimonate | 1.5049 |

As the oxetane compound, either di[1-ethyl(3-oxetanyl)] methyl ether (product name DOX made by Toagosei Co., Ltd.), xylene dioxetane (product name XDO made by Toagosei Co., Ltd.), phenol novolac oxetane (made by Toagosei Co., Ltd.), or oxetanyl silsesquioxetane (product name OXSQ made by Toagosei Co., Ltd) was prepared.

As the oxirane compound, either one of the following components was prepared: limonene dioxide (product name celloxide 3000 made by Daicel Chemical Industries, Ltd.), polyfunctional aliphatic cyclic epoxy resin (product name EHPE3150 made by Daicel Chemical Industries, Ltd.), a mixture (mixing ratio of about 1:1) of bisphenol A epoxy resin and bisphenol F epoxy resin (product name epotohto ZX1059 made by Tohto Kasei Co., Ltd.), a bisphenol A epoxy resin (product name epicoat 828 made by Yuka Shell Epoxy K.K.) and a bifunctional aliphatic cyclic epoxy resin (product name celloxide 2021P made by Daicel Chemical Industries, Ltd.).

As the cationic polymerization initiator, 4-4'bis [di (βhydroxyethoxy)phenylsulfonio]phenylsulfide-bis-hexafluoroantimonate (product name SP170 made by Asahi Denka Kogyo K.K.) was prepared.

The refractive indices to the D line of sodium at 25° C. of the materials are also shown in Table 1.

In Examples 1 to 10, the oxetane compound, the oxirane compound, and the cationic polymerization initiator were mixed at each of the ratios shown in Tables 2 and 3 and heated at 90° C. for two hours, thereby obtaining materials for optical waveguide.

In Comparative example to Examples 1 to 10, an oxetane compound was not mixed but an oxirane compound and a cationic polymerization initiator were mixed at the ratio shown in Table 3 and heated at 90° C. for two hours, thereby obtaining a material for optical waveguide.

TABLE 2

| | | Example 1 | Example 2 | Example 3 | Example 4 | Example 5 | Example 6 |
|---|---|---|---|---|---|---|---|
| Oxetane compound (parts by weight) | di[1-ethyl(3-oxetanyl)] methyl ether | 70 | 50 | 30 | — | — | — |
| | xylene dioxetane | — | — | — | 20 | 20 | — |
| | phenol novolac oxetane | — | — | 10 | 20 | 40 | 60 |
| | oxetanyl silsesquioxetane | — | — | — | — | — | — |
| Oxirane compound (parts by weight) | limonene dioxide | — | — | — | — | — | — |
| | polyfunctional aliphatic cyclic epoxy resin | 30 | — | 15 | — | — | — |
| | mixture of bisphenol A epoxy resin and bisphenol F epoxy resin | — | — | 20 | 30 | 10 | 20 |
| | bisphenol A epoxy resin | — | 50 | 70 | — | — | — |
| | bifunctional aliphatic cyclic epoxy resin | — | — | — | 30 | 30 | 20 |
| Cationic polymerization initiator (parts by weight) | 4-4'bis[di(β hydroxyethoxy) phenyl sulfonio] phenylsulfide-bis-hexafluoro-antimonate | 2 | 2 | 2 | 2 | 2 | 2 |
| solvent resistance (seconds) | | ≧60 | ≧60 | 25 | 20 | 35 | 38 |
| curability (existence of tack) | | good (no) | good (no) | good (no) | good (no) | good (no) | good (no) |
| refractive index after curing | | 1.4962 | 1.5361 | 1.5501 | 1.5604 | 1.5693 | 1.5802 |

TABLE 3

| | | Example 7 | Example 8 | Example 9 | Example 10 | Comparative Example |
|---|---|---|---|---|---|---|
| Oxetane compound (parts by weight) | di[1-ethyl(3-oxetanyl)] methyl ether | — | 15 | 10 | 40 | — |
| | xylene dioxetane | — | — | — | 20 | — |
| | phenol novolac oxetane | 60 | — | — | 20 | — |
| | oxetanyl silsesquioxetane | — | 20 | — | 45 | — |
| Oxirane compound (parts by weight) | limonene dioxide | — | — | — | — | 10 |
| | polyfunctional aliphatic cyclic epoxy resin | — | 35 | 25 | — | 40 |
| | mixture of bisphenol A epoxy resin and bisphenol F epoxy resin | 20 | — | — | 30 | — |
| | bisphenol A epoxy resin | — | — | 30 | — | — |
| | bifunctional aliphatic cyclic epoxy resin | 20 | 30 | 35 | 30 | 50 |
| Cationic polymerization initiator (parts by weight) | 4-4'bis[di(β hydroxyethoxy) phenyl sulfonio] phenylsulfide-bis-hexafluoro-antimonate | 4 | 2 | 2 | 6 | 2 |
| solvent resistance (seconds) | | 43 | 40 | 10 | 20 | 5 |
| curability (existence of tack) | | good (no) | good (no) | ok (one side) | ok (one side) | ok (one side) |
| refractive index after curing | | 1.5802 | 1.5113 | 1.5382 | 1.5607 | 1.5234 |

A solvent resistance test was carried out in the following manner on the materials of Examples 1 to 10 and comparative example obtained as described above. An organic material layer made of each of the materials for optical waveguide was deposited on a glass plate by spin coating (at 3000 rpm of rotational speed of a spinner for 30 seconds). The material was irradiated with ultraviolet rays for 30 seconds with an output of 24 mW/cm$^2$ by using a mercury lamp of very high pressure. At this time, the thickness of the cured organic material layer was 30 $\mu$m. After that, the cured material was dipped in acetone and time until the material was swollen was measured. The results were shown in Tables 2 and 3.

As understood from Tables 2 and 3, the materials cured with the irradiation of ultraviolet rays of Examples 1 to 10 in which the oxetane compound is formulated exhibits high solvent resistance. It was found that the time until the material is swollen of especially the materials in Examples 1 and 2 in which 50 parts by weight or more of di[1-ethyl (3-oxetanyl)]methyl ether were formulated is longer than that of Comparative example by 12 times or more.

The curability test was also carried out on each of the obtained materials for optical waveguide. In the curability test, an organic material layer was formed by sandwiching each of the materials for optical waveguide between two films made of polyethylene terephthalate (PET). By adjusting the gap between the PET films, the thickness of the organic material layer of 100 $\mu$m was set. After that, one of the PET films of the organic material layer was irradiated with ultraviolet rays for 30 seconds with an output of 24 mW/cm$^2$ by using a metal halide lamp to thereby cure the organic material layer. After that, the organic material layer was left for one hour. The PET films were peeled off and the state of the cured organic material layer was examined by touching it with a finger. The results are shown in Tables 2 and 3. "No" shows a case where there is no tack on both faces which were in contact with the PET films of the organic material layer. "One side" shows a case where there is no tack only on the face irradiated with ultraviolet rays.

As understood from Tables 2 and 3, in Examples 1 to 8, no tack was found in both sides of each of the organic materials, which had been in contact with the PET films and the curability was high. In Examples 9 and 10 and Comparative example, although no tack was found on the face irradiated with the ultraviolet rays, a tack was found on the opposite face. The curability was slightly lower as compared with Examples 1 to 8.

Further, the refractive index with respect to the D line of sodium at 25° C. was measured on each of the obtained materials for optical waveguide. Specifically, in a manner similar to the curability test, each of the materials having a thickness of 100 $\mu$m was sandwiched between two PET films to thereby form an organic material layer. One of the PET films was irradiated with ultraviolet rays for 30 seconds with an output of 24 mW/cm$^2$ by using a metal halide lamp, thereby curing the organic material layer. After elapse of 24 or more hours, the refractive index was measured. The results are also shown in Tables 2 and 3.

The refractive indices of the cured materials of Examples 1 and 8 were 1.4962 and 1.5113, respectively. It is understood that each of the materials is preferable as the material for cladding. The refractive index of each of the cured materials of other Examples was higher than 1.53. It is understood that each of the materials is also preferable as the material for core.

EXAMPLE 11

In the example, a material for core in an optical waveguide was obtained by mixing 10 parts by weight of xylene dioxetane, 20 parts by weight of phenol novolac oxetane, 30 parts by weight of bifunctional aliphatic cyclic epoxy resin, 20 parts by weight of a mixture of bisphenol A epoxy resin and bisphenol F epoxy resin, and 20 parts by weight of bisphenol A epoxy resin, heating the mixture at 90° C. for two hours to dissolve the components, and adding 2 parts by weight of a cationic polymerization initiator. Further, by performing filtering to remove dusts and the like, a material for core of an optical waveguide was obtained. The same products described in Examples 1 to 10 were used as the materials.

Subsequently, a material for cladding of an optical waveguide was obtained by mixing 22 parts by weight of di[1-ethyl(3-oxetanyl)]methyl ether, 13 parts by weight of oxetanyl silsesquioxetane, 35 parts by weight of polyfunctional aliphatic cyclic epoxy resin, and 30 parts by weight of bifunctional aliphatic cyclic epoxy resin, heating the mixture at 90° C. for two hours, and adding 2 parts by weight of a cationic polymerization initiator. Further, by performing filtering to remove dusts and the like, a material for cladding of an optical waveguide was obtained. The same products described in Examples 1 to 10 were used as the materials.

As shown in FIG. 1A, the substrate 10 made of silicon was prepared and the organic material layer 11$a$ made of the obtained material for cladding of an optical waveguide was deposited on the entire substrate 10 by spin coating (at 3000 rpm of rotational speed of a spinner for 30 seconds). After that, as shown in FIG. 1B, the organic material layer 11$a$ was irradiated with ultraviolet rays UV for 100 seconds with an output of about 25 mW/cm$^2$ by using a mercury lamp of very high pressure (that is, the exposure energy of 2500 mJ/cm$^2$) to cure the organic material layer 11$a$, thereby forming the cladding 11 (FIG. 1C). At this time, the thickness of the cladding 11 was 30 $\mu$m. The refractive index of the cladding 11 with respect to the D line of sodium at 25° C. was 1.510.

As shown in FIG. 1D, by applying the obtained material for core of an optical waveguide on the cladding 11 by spin coating (at 3000 rpm of the rotational speed of a spinner for 30 seconds), the organic material layer 12$a$ was formed.

The photomask 21 having striped apertures each having a width of 30 $\mu$m is disposed apart from the surface of the cladding 11 by 100 $\mu$m. The organic material layer 12$a$ was irradiated with the ultraviolet rays UV through the photomask 21. The ultraviolet rays UV were emitted with an output of about 25 mW/cm$^2$ for 60 seconds (that is, exposure energy of 1500 mJ/cm$^2$) by using a mercury lamp of very high pressure (proximity printing). Thus, as shown in FIG. 1E, the material for core of an optical waveguide as a component of the organic material layer 12$a$ was cured in portions 12$a_1$ corresponding to the apertures of the photomask 21 of the organic material layer 12$a$. At this time, the thickness of the cured organic material layer 12$a$ was 30 $\mu$m. The refractive index with respect to the D line of sodium at 25° C. was 1.563. The difference between the refractive index of the core and that of the cladding 11 was 0.053.

After the application of the ultraviolet rays UV, the uncured portions 12$a_2$ which had not been irradiated with the ultraviolet rays UV because of the photomask 21 were dissolved and removed with acetone. Subsequently, the organic material layer 12$a$ (12$a_1$) was washed by using isopropyl alcohol to remove acetone which penetrates in the organic material layer 12$a$ (12$a_1$). In such a manner, as shown in FIG. 1F, a plurality of cores 12 each having a strip shape in plan view were formed.

Finally, as shown in FIG. 1G, the cladding 13 was formed on the exposed face of the cladding 11 and the cores 12 by using a material similar to that of the cladding 11 in a manner similar to the method of forming the cladding 11, thereby obtaining a buried type optical waveguide.

EXAMPLE 12

An optical waveguide was manufactured in a manner similar to Example 11 except that cores each having a width of 50 μm were formed by using the photomask 21 (refer to FIG. 1D) having apertures in stripes each having a width of 50 μm.

EXAMPLE 13

An optical waveguide was manufactured in a manner similar to Example 11 except that cores each having a width of 70 μm were formed by using the photomask 21 having apertures in stripes each having a width of 70 μm.

A test related to an optical propagation loss was carried out on each of the optical waveguides of Examples 11 to 13 obtained as described above. In the test, a semiconductor laser having wavelengths of 790 nm and 650 nm was used and propagation losses in both TE (Transverse Electro) mode and TM (Transverse Magnetic) mode were measured by a cutback method (method of measuring the output power of the optical waveguide while gradually cutting the optical waveguide). The results are shown in Table 4.

TABLE 4

| measurement | | propagation loss (dB/cm) | | |
| --- | --- | --- | --- | --- |
| wavelength (nm) | propagation mode | core width 30 μm | core width 50 μm | core width 70 μm |
| 790 | TE mode | 0.23 | 0.25 | 0.22 |
|  | TM mode | 0.25 | 0.22 | 0.17 |
| 650 | TE mode | 0.34 | 0.37 | 0.33 |
|  | TM mode | 0.30 | 0.36 | 0.30 |

The TE mode denotes a mode in which an electric field component exists only in a cross section of the optical waveguide and a magnetic field component exists in the light propagation direction. The TM mode denotes a mode in which the magnetic field component exists only in the cross section of the optical waveguide and an electric field component exists in the light propagation direction.

As understood from Table 4, the optical waveguides of Examples 11 to 13 had small light propagation losses of 0.17 to 0.37 dB/cm in both the TE and TM modes. The excellent optical waveguides each having a small light propagation loss which is almost as small as that of the optical waveguide made of an epoxy resin were obtained.

Although the invention has been described by the embodiment and examples, the invention is not limited to the embodiment and examples but can be variously modified. For example, in the embodiment and examples, the ultraviolet rays UV were emitted as energy beams from the mercury lamp of very high pressure as a light source. As the light source of ultraviolet rays UV, another light source such as mercury arc lamp, xenon arc lamp, fluorescent lamp, carbon arc lamp or tungsten-halogen radiation lamp may be used. It is also possible to use X-ray, electron beams or sunlight as an energy beam.

In each of the embodiment and examples, the case of manufacturing the optical waveguide comprising the cores 12 and the claddings 11 and 13 has been described. The invention can be also applied to a case of constructing the optical waveguide only by cores.

According to the material for optical waveguide of the invention, since the material for optical waveguide contains the first compound including an oxetane ring having high repeated reactivity in a chain reaction and the second compound capable of initiating polymerization by the chain reaction. Therefore, the material has high polymerizability at the time of the chain reaction, and thus can promptly progress the chain reaction. A polymer having a high degree of crosslinking and high solvent resistance can be obtained. Particularly, according to the material for optical waveguide of one aspect of the invention, in a material for optical waveguide comprising a third compound including an oxirane ring, which has high reactivity to generate active species in a chain reaction, the chain reaction can be promptly progressed.

Since the optical waveguide of the invention is formed by using the material for optical waveguide of the invention, the mechanical strength can be increased.

Further, according to the method for manufacturing the optical waveguide of the invention, the organic material layer is formed by using the material for optical waveguide of the invention. Therefore, the areas selectively exposed in the organic material layer are hardly dissolved during the developing process, so that the optical waveguide in a desired shape can be formed.

According to the method for manufacturing the optical waveguide of the invention, since the polymerizability at the time of the chain reaction is high, the production efficiency can be improved. Especially according to the method for manufacturing the optical waveguide of one aspect fo the invention, the material for an optical waveguide comprises the third compound including the oxirane ring, which has high reactivity to generate active species in the chain reaction. This enhances the effect obtained.

Especially, according to the method for manufacturing the optical waveguide of one aspect of the invention, the material for optical waveguide comprising the first and third compounds which have high compatibility with each other is used. Therefore, the refractive indices of the compounds are stably reflected in the refractive index of the cured material.

Obviously many modifications and variations of the present invention are possible in the light of the above teachings. It is therefore to be understood that within the scope of the appended claims the invention may be practiced otherwise than as specifically described.

What is claimed is:

1. A material for an optical waveguide through which a light signal can propagate, comprising:

a first compound having an oxetane ring, wherein a refractive index of the first compound with respect to the D line of sodium at 25° C. lies within the range from 1.45 to 1.58; and a second compound capable of initiating polymerization by a chain reaction.

2. A material for an optical waveguide according to claim 1, comprising greater than 50 percent by weight to 70 percent by weight of the first compound.

3. A material for an optical waveguide according to claim 1, further comprising a third compound having an oxirane ring.

4. A material for an optical waveguide according to claim 3, wherein a weight ratio of the first compound to the third compound (weight of the first compound/weight of the third compound) lies within the range from greater than 5/5 to 7/3.

5. A material for an optical waveguide according to claim 1, wherein the first compound is phenol novolac oxetane.

6. A material for an optical waveguide according to claim 1, wherein the refractive index of the first compound with respect to the D line of sodium at 25° C. lies within the range from 1.50 to 1.58.

7. A material for an optical waveguide according to claim 3, wherein a refractive index of the third compound with respect to the D line of sodium at 25° C. lies within the range from 1.45 to 1.58.

8. A material for an optical waveguide according to claim 3, wherein a refractive index of the third compound with respect to the D line of sodium at 25° C. lies within the range from 1.50 to 1.58.

9. An optical waveguide through which a light signal can propagate, comprising:

a material comprising a first compound having an oxetane ring and a second compound capable of initiating polymerization by a chain reaction, wherein a refractive index of the material for an optical waveguide with respect to the D line of sodium at 25° C. lies within the range from 1.45 to 1.61.

10. An optical waveguide according to claim 9, wherein the material for an optical waveguide comprises 10 percent by weight to 70 percent by weight of the first compound.

11. An optical waveguide according to claim 9, wherein the material for an optical waveguide further comprises a third compound having an oxirane ring.

12. An optical waveguide according to claim 11, wherein the material for an optical waveguide has a weight ratio of the first compound to the third compound (weight of the first compound/weight of the third compound) which lies within the range from greater than 5/5 to 7/3.

13. An optical waveguide according to claim 9, wherein a refractive index of the first compound with respect to the D line of sodium at 25° C. lies within the range from 1.45 to 1.58.

14. An optical waveguide according to claim 10, wherein the first compound is phenol novolac oxetane.

15. An optical waveguide according to claim 9, comprising a core and a cladding, wherein the cladding comprises the material for an optical waveguide.

16. A method for manufacturing an optical waveguide through which a light signal can propagate, the method comprising:

a step of forming an organic material layer on a supporting substrate by using a material for an optical waveguide comprising a first compound having an oxetane ring and a second compound capable of initiating polymerization by a chain reaction;

a step of selectively exposing and curing the organic material layer by selectively irradiating the organic material layer with an energy beam; and a step of forming an optical waveguide by a developing process of removing an uncured portion in the organic material layer.

17. A method for manufacturing an optical waveguide according to claim 16, wherein the material for an optical waveguide further comprises a third compound having an oxirane ring.

18. A method for manufacturing an optical waveguide according to claim 16, wherein in the step of forming the optical waveguide, the uncured portion in the organic material layer is removed by using an organic developing solution.

19. A method for manufacturing an optical waveguide according to claim 18, wherein the developing solution comprises acetone.

20. A method for manufacturing an optical waveguide according to claim 16, wherein the step of forming the optical waveguide includes a step of washing the optical waveguide by using a rinsing solution.

21. A method for manufacturing an optical waveguide according to claim 20, wherein in the step of washing the optical waveguide, an organic rinsing solution is used.

22. A method for manufacturing an optical waveguide according to claim 21, wherein the rinsing solution comprises isopropyl alcohol.

23. A method for manufacturing an optical waveguide according to claim 16, wherein in the step of exposing the organic material layer, a proximity printing method or a projection printing method is used.

* * * * *